US010457245B2

(12) United States Patent
Fukumoto et al.

(10) Patent No.: US 10,457,245 B2
(45) Date of Patent: Oct. 29, 2019

(54) GAS GENERATOR

(71) Applicant: DAICEL CORPORATION, Osaka-shi, Osaka (JP)

(72) Inventors: Kenji Fukumoto, Tatsuno (JP); Tomoharu Kobayashi, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 15/771,915

(22) PCT Filed: Nov. 16, 2016

(86) PCT No.: PCT/JP2016/083889
§ 371 (c)(1),
(2) Date: Apr. 27, 2018

(87) PCT Pub. No.: WO2017/090491
PCT Pub. Date: Jun. 1, 2017

(65) Prior Publication Data
US 2018/0354451 A1    Dec. 13, 2018

(30) Foreign Application Priority Data

Nov. 26, 2015 (JP) .................................. 2015-230815

(51) Int. Cl.
*B60R 21/264* (2006.01)
*F15B 15/19* (2006.01)
(52) U.S. Cl.
CPC ............ *B60R 21/264* (2013.01); *F15B 15/19* (2013.01)
(58) Field of Classification Search
CPC ............ B01D 46/2403; B01D 46/0005; B01D 46/001; B01J 7/00; B60R 21/2644; B60R 2021/2648
(Continued)

(56) References Cited

U.S. PATENT DOCUMENTS 3,904,221 A * 9/1975 Shiki .................... B60R 21/2644
280/736
5,753,852 A * 5/1998 Bernau ............... B60R 21/2644
102/530
(Continued)

FOREIGN PATENT DOCUMENTS

JP          11-78766 A      3/1999
JP        2002-539007 A    11/2002
(Continued)

*Primary Examiner* — Samir Abdosh
(74) *Attorney, Agent, or Firm* — Birch, Stewart, Kolasch & Birch, LLP

(57) ABSTRACT

The present invention provides a gas generator including, in a cylindrical housing, a combustion chamber which is filled with gas generating agents as a gas source, and a gas discharge port for discharging a gas generated by combustion of the gas generating agents,
the combustion chamber including,
an ignition device which includes an igniter and closes a first end opening of the cylindrical housing, a partition wall which closes a second end opening on the side axially opposite to the first end opening, and a perforated cylindrical body which is disposed in an inner space thereof;
the igniter having an igniter main body which includes an ignition portion, and an igniter collar which surrounds and holds the igniter main body;
the perforated cylindrical body being disposed such that a first end thereof surrounds the ignition portion of the igniter, and a second end thereof on the axially opposite side being located on the side of the partition wall;
an inside space of the perforated cylindrical body being a first chamber which is filled with part of the gas generating agents, and an outside space of the perforated cylindrical body being a second chamber which is filled with the remaining gas generating agents; and (Continued)

the gas discharge port being a through hole which is formed in a portion of the partition wall facing the second chamber.

15 Claims, 5 Drawing Sheets

(58) Field of Classification Search
USPC .......................................................... 102/530
See application file for complete search history.

(56) References Cited

U.S. PATENT DOCUMENTS

| | | | |
|---|---|---|---|
| 6,412,816 B1 | 7/2002 | Gast et al. | |
| 6,460,883 B1* | 10/2002 | Nakashima | B01D 46/24 |
| | | | 280/736 |
| 6,485,051 B1* | 11/2002 | Taguchi | B60R 21/2644 |
| | | | 280/736 |
| 6,540,256 B2* | 4/2003 | Iwai | B60R 21/2644 |
| | | | 280/736 |
| 6,547,275 B2* | 4/2003 | Nakashima | B01D 46/24 |
| | | | 280/736 |
| 6,929,284 B1* | 8/2005 | Saso | B60R 21/2644 |
| | | | 280/736 |
| 7,390,019 B2* | 6/2008 | Gotoh | B60R 21/2644 |
| | | | 280/736 |
| 7,404,574 B2* | 7/2008 | Hirooka | B60R 21/2644 |
| | | | 280/741 |
| 7,556,289 B2* | 7/2009 | Katsuda | B60R 21/2338 |
| | | | 280/736 |
| 7,600,783 B2* | 10/2009 | Numoto | B60R 21/2644 |
| | | | 280/736 |
| 2001/0013300 A1* | 8/2001 | Lutz | B60R 21/2644 |
| | | | 102/530 |
| 2002/0135172 A1* | 9/2002 | Koga | B60R 21/2644 |
| | | | 280/741 |
| 2002/0190511 A1* | 12/2002 | Watase | B60R 21/2644 |
| | | | 280/740 |
| 2004/0061319 A1* | 4/2004 | Saso | B60R 21/2644 |
| | | | 280/741 |
| 2005/0052006 A1* | 3/2005 | Nishimura | B60R 21/261 |
| | | | 280/736 |
| 2005/0161923 A1* | 7/2005 | Hirooka | B60R 21/2644 |
| | | | 280/741 |
| 2006/0119086 A1* | 6/2006 | Blessing | B60R 21/2644 |
| | | | 280/736 |
| 2008/0061541 A1* | 3/2008 | Yano | B60R 21/264 |
| | | | 280/741 |
| 2008/0129027 A1* | 6/2008 | Nakayasu | B60R 21/2644 |
| | | | 280/741 |
| 2008/0257195 A1* | 10/2008 | Nakayasu | B60R 21/2644 |
| | | | 102/530 |
| 2008/0284146 A1* | 11/2008 | Hirooka | B60R 21/2644 |
| | | | 280/736 |
| 2011/0179967 A1* | 7/2011 | Yamazaki | B60R 21/2644 |
| | | | 102/530 |
| 2012/0031294 A1* | 2/2012 | Aoyagi | B60R 21/2644 |
| | | | 102/530 |
| 2014/0096697 A1* | 4/2014 | Okuyama | B60R 21/2644 |
| | | | 102/530 |
| 2018/0154859 A1* | 6/2018 | Kubo | B60R 21/264 |

FOREIGN PATENT DOCUMENTS

| | | |
|---|---|---|
| JP | 2005-178643 A | 7/2005 |
| JP | 2015-024681 A | 2/2015 |

* cited by examiner

[Fig. 1]
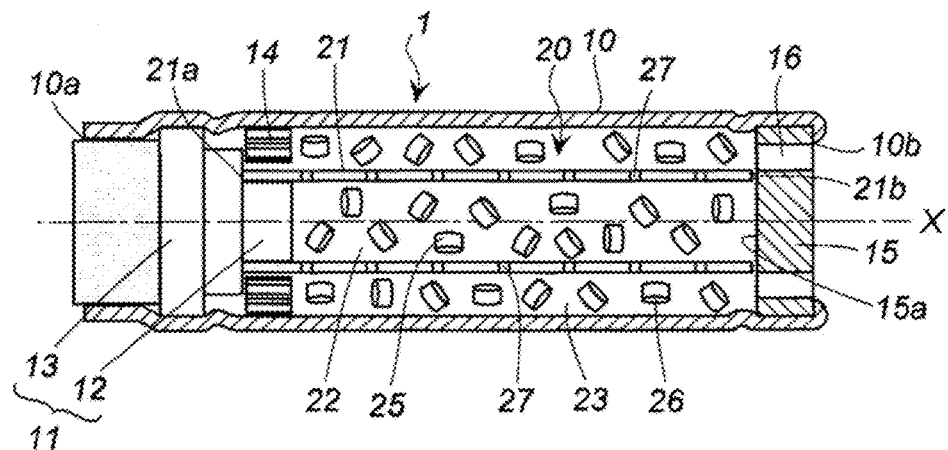
[Fig. 2]
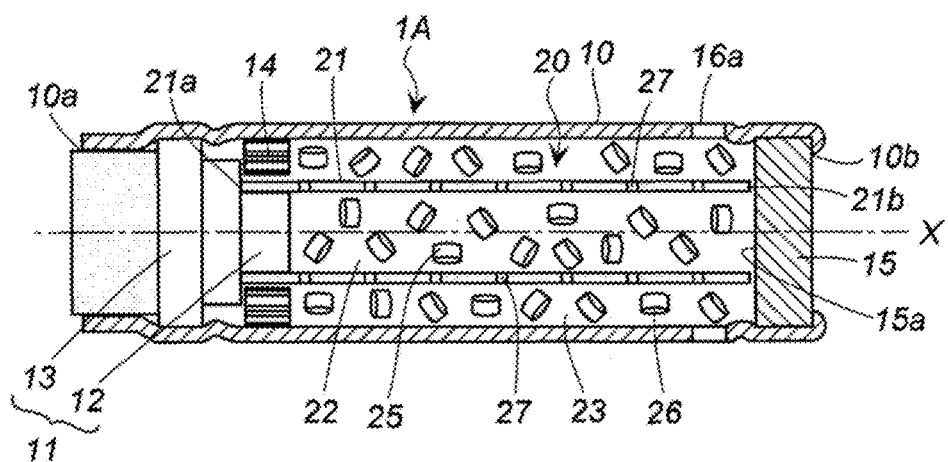

[Fig. 3]
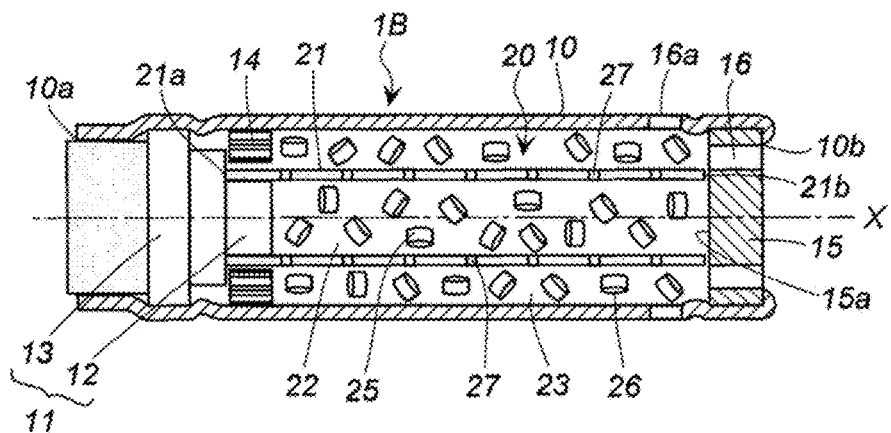
[Fig. 4]
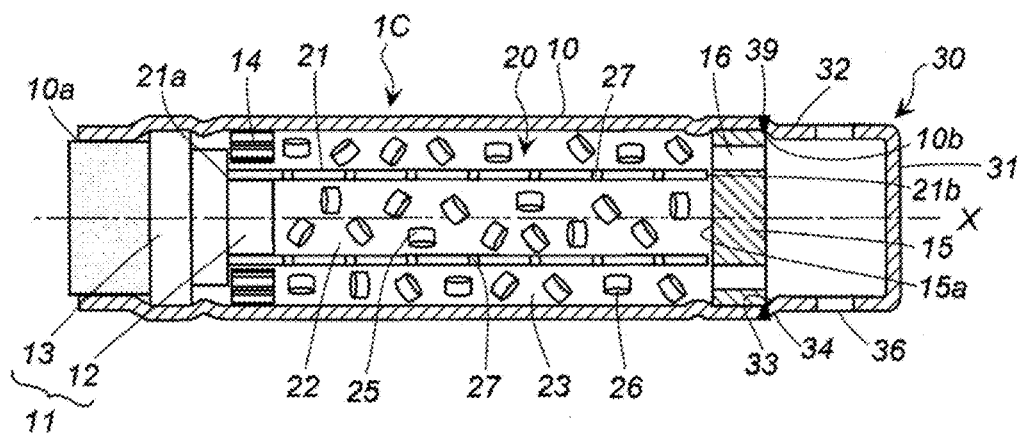

[Fig. 5]
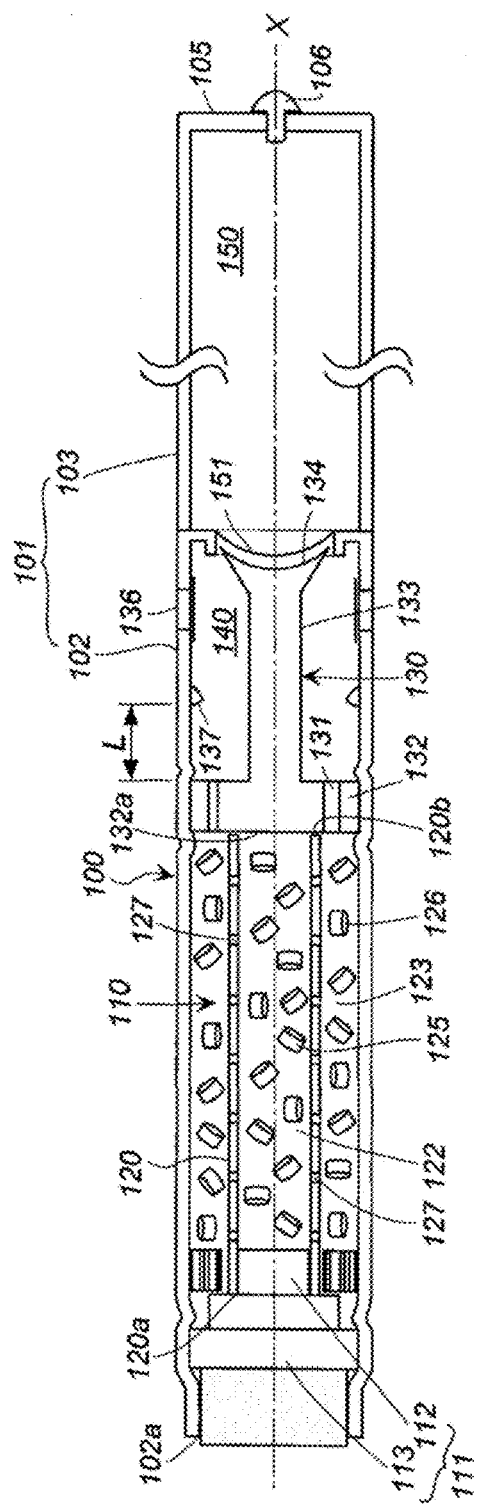

[Fig. 6]
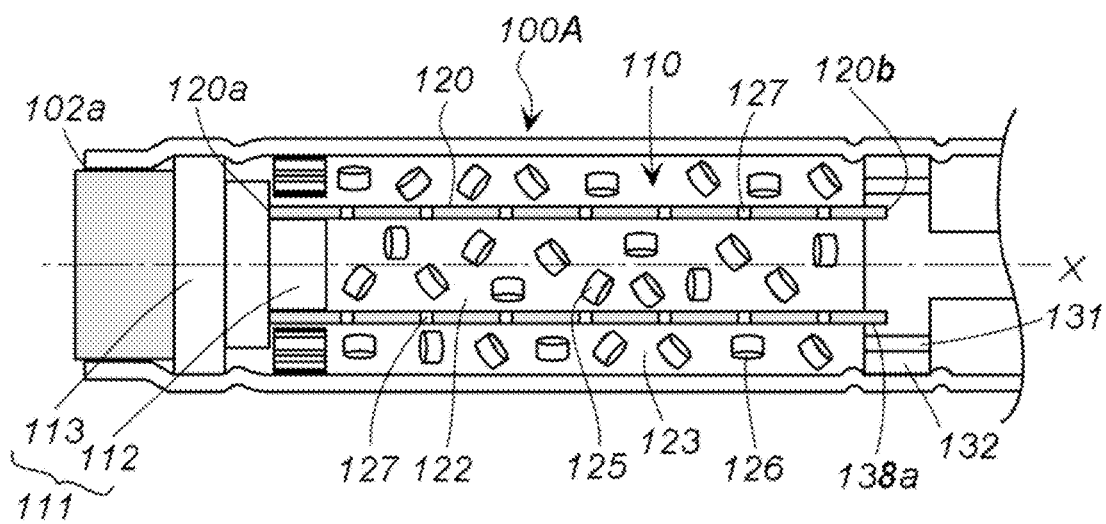
[Fig. 7]
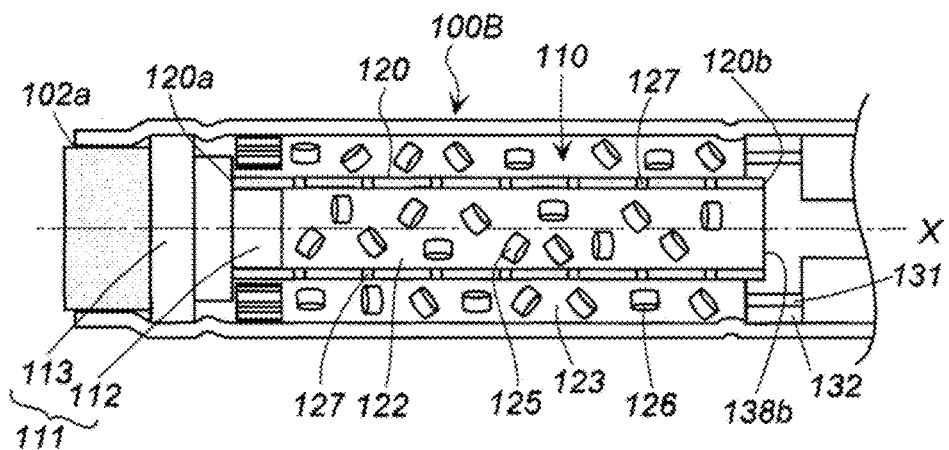

[Fig. 8]
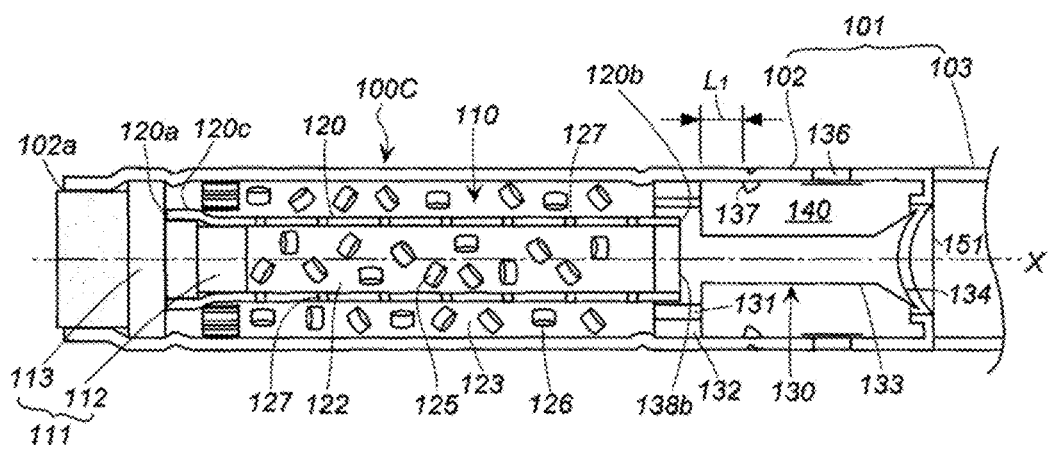
[Fig. 9]
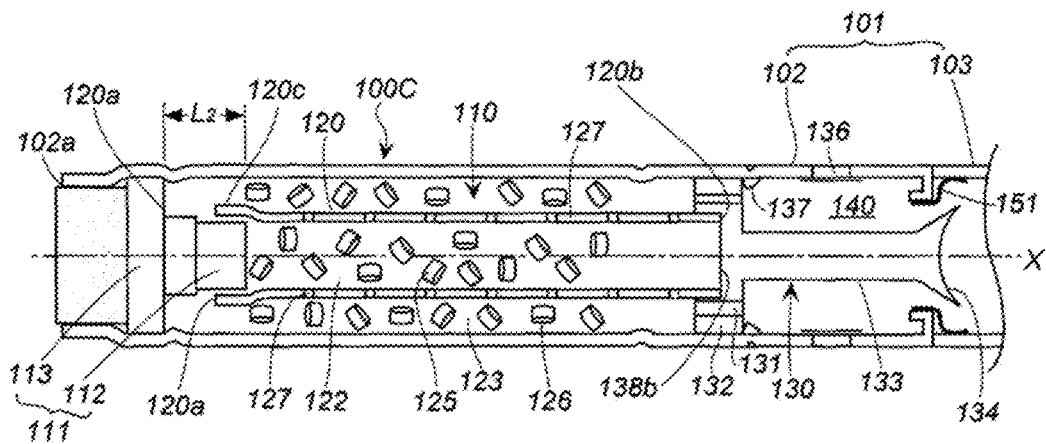

GAS GENERATOR

FIELD OF INVENTION

The present invention relates to a gas generator for use in an airbag apparatus to be installed in an automobile.

DESCRIPTION OF RELATED ART

FIG. 1 to FIG. 4 of JP-A No. 11-78766 disclose a gas generator X1 in which a long cylindrical housing 1 is used.

In the gas generator depicted in FIG. 1 to FIG. 4, a combustion chamber G is divided into an inner combustion chamber G1 and an outer combustion chamber G2 by disposing a partition cylinder 20 in the combustion chamber G, and the inner combustion chamber G1 and the outer combustion chamber G2 are each filled with gas generating agents 2.

It is described that in the gas generator in FIG. 1 to FIG. 4, when an ignition device 15 located at a position facing only the inner combustion chamber G1 is actuated, the gas generating agent 2 in the inner combustion chamber G1 is burned first and the gas generating agent 2 in the outer combustion chamber G2 is burned with a delay, thereby making it possible to control a deploying speed of an airbag.

SUMMARY OF INVENTION

The present invention (the first aspect) provides a gas generator including, in a cylindrical housing, a combustion chamber which is filled with gas generating agents as a gas source, and a gas discharge port for discharging a gas generated by combustion of the gas generating agents, the combustion chamber including,
an ignition device which includes an igniter and closes a first end opening of the cylindrical housing, a partition wall which closes a second end opening on the side axially opposite to the first end opening, and a perforated cylindrical body which is disposed in an inner space thereof;
the igniter having an igniter main body, which includes an ignition portion, and an igniter collar which surrounds and holds the igniter main body;
the perforated cylindrical body being disposed such that a first end thereof surrounds the ignition portion of the igniter, and a second end thereof on the axially opposite side being located on the side of the partition wall;
an inside space of the perforated cylindrical body being a first chamber which is filled with part of the gas generating agents, and an outside space of the perforated cylindrical body being a second chamber which is filled with the remaining gas generating agents; and
the gas discharge port being a through hole which is formed in a portion of the partition wall facing the second chamber.

The present invention (the second aspect) provides a gas generator including, in a cylindrical housing, a combustion chamber which is filled with gas generating agents as a gas source, and a gas discharge port for discharging a gas generated by combustion of the gas generating agents,
the combustion chamber including,
an ignition device which includes an igniter and closes a first end opening of the cylindrical housing, a partition wall which closes a second end opening on the side axially opposite to the first end opening, and a perforated cylindrical body which is disposed in an inner space thereof;
the igniter having an igniter main body, which includes an ignition portion, and an igniter collar which surrounds and holds the igniter main body;
the perforated cylindrical body being disposed such that a first end thereof surrounds the ignition portion of the igniter, and a second end thereof on the axially opposite side being located on the side of the partition wall;
an inside space of the perforated cylindrical body being a first chamber which is filled with part of the gas generating agents, and an outside space of the perforated cylindrical body being a second chamber which is filled with the remaining gas generating agents; and
the gas discharge port being a through hole which is formed in a portion of the cylindrical housing facing the second chamber on the side of the partition wall.

The present invention (the third aspect) provides a gas generator including, in a cylindrical housing, a combustion chamber which is filled with gas generating agents as a gas source, and a gas discharge port for discharging a gas generated by combustion of the gas generating agents,
the combustion chamber including,
an ignition device which includes an igniter and closes a first end opening of the cylindrical housing, a partition wall which closes a second end opening on the side axially opposite to the first end opening, an inner space which is obtained therein, and a perforated cylindrical body which is disposed in the inner space;
the igniter having an igniter main body, which includes an ignition portion, and an igniter collar which surrounds and holds the igniter main body;
the perforated cylindrical body being disposed such that a first end thereof surrounds the ignition portion of the igniter, and a second end thereof on the axially opposite side being located on the side of the partition wall;
an inside space of the perforated cylindrical body being a first chamber which is filled with part of the gas generating agents, and an outside space of the perforated cylindrical body being a second chamber which is filled with the remaining gas generating agents;
a diffuser portion being arranged at the second end opening of the cylindrical housing, which is closed by the partition wall;
the gas discharge port including a first gas discharge port which is a through hole famed in a portion of the partition wall facing the second chamber and a second gas discharge port which is formed in the diffuser portion; and
a combustion gas generated in a combustion chamber being discharged from the first gas discharge port into the diffuser portion and then discharged from the second gas discharge port.

The present invention (the fourth aspect) provides a gas generator including a combustion chamber which has a first gas discharge port and is filled with gas generating agents, a diffuser chamber which has a second gas discharge port, and a pressurized gas chamber in the order of description from a first end opening of a cylindrical housing toward a second end opening on the side axially opposite thereto;
a closing member closing between the diffuser chamber and the pressurized gas chamber;
a breaking device being disposed between the combustion chamber and the diffuser chamber, having a base plate portion and a breaking portion, and moving toward the second end opening at the time of actuation to break the closing member;
the combustion chamber including,
an ignition device which includes an igniter and closes a first end opening of the cylindrical housing, the base plate of the breaking device, which closes a side axially opposite to the first end opening, an inner space which is obtained therein, and a perforated cylindrical body which is disposed in the inner space;

the igniter having an igniter main body which includes an ignition portion, and an igniter collar which surrounds and holds the igniter main body;

the perforated cylindrical body being disposed such that a first end thereof surrounds the ignition portion of the igniter, and a second end thereof on the axially opposite side being located on the side of the partition wall;

an inside space of the perforated cylindrical body being a first chamber which is filled with part of the gas generating agents, and an outside space of the perforated cylindrical body being a second chamber which is filled with the remaining gas generating agents;

the first gas discharge port being opened to transfer a combustion gas from the combustion chamber to the diffuser chamber, and the first gas discharge port being a through hole which is formed in a portion of the base plate facing the second chamber; and the second gas discharge port being opened to discharge the combustion gas and a pressurized gas to the outside of the cylindrical housing, and the second gas discharge port being a through hole which is formed in a portion of a circumferential wall of the cylindrical housing forming the diffuser chamber.

The present invention (the fifth aspect) provides a gas generator including, in a cylindrical housing, a combustion chamber which is filled with gas generating agents as a gas source, and a gas discharge port for discharging a gas generated by combustion of the gas generating agents, the combustion chamber including, an ignition device which includes an igniter and closes a first end opening of the cylindrical housing, a partition wall which closes a second end opening on the side axially opposite to the first end opening, and a perforated cylindrical body which is disposed in an inner space thereof;

the igniter having an igniter main body which includes an ignition portion, and an igniter collar which surrounds and holds the igniter main body;

the perforated cylindrical body being disposed such that a first end thereof surrounds the ignition portion of the igniter, and a second end thereof on the axially opposite side being located on the side of the partition wall;

an inside space of the perforated cylindrical body being a first chamber which is filled with part of the gas generating agents, and an outside space of the perforated cylindrical body being a second chamber which is filled with the remaining gas generating agents; and the gas discharge port including a through hole which is formed in a portion of the partition wall facing the second chamber, and a through hole which is formed in a portion of the cylindrical housing facing the second chamber on the side of the partition wall.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows a sectional view, in the longitudinal direction, of a gas generator according to the first aspect;

FIG. 2 shows a sectional view, in the longitudinal direction, of a gas generator according to the second aspect;

FIG. 3 shows a sectional view, in the longitudinal direction, of a gas generator according to the fifth aspect;

FIG. 4 shows a sectional view, in the longitudinal direction, of a gas generator according to the third aspect;

FIG. 5 shows a sectional view, in the longitudinal direction, of a gas generator according to the fourth aspect;

FIG. 6 shows a partial sectional view, in the longitudinal direction, of a gas generator according to the fourth aspect which is an embodiment different from that shown in FIG. 5;

FIG. 7 shows a partial sectional view, in the longitudinal direction, of a gas generator according to the fourth aspect which is yet another embodiment different from that shown in FIG. 5;

FIG. 8 shows a partial sectional view (before actuation), in the longitudinal direction, of a gas generator according to the fourth aspect which is yet another embodiment different from that shown in FIG. 5; and FIG. 9 shows a partial sectional view, in the longitudinal direction, illustrating a state after the gas generator shown in FIG. 8 is actuated.

DETAILED DESCRIPTION OF THE INVENTION

In the gas generator depicted in FIG. 1 to FIG. 4 of JP-A No. 11-78766, by burning the gas generating agent 2 in the outer combustion chamber G2 with a delay, it is possible to control the deploying speed of the airbag. Therefore, the gas generating agent 2 in the outer combustion chamber G2 is less combustible than the gas generating agent 2 in the inner combustion chamber G1.

The present invention provides a gas generator including a combustion chamber filled with gas generating agents as a gas source in a cylindrical housing, the gas generator in which a combustibility of the gas generating agents in the combustion chamber being improved.

The cylindrical housing is formed of a metal such as iron or stainless steel, similarly to cylindrical housings of known gas generators.

A first end opening of the cylindrical housing is closed by an ignition device including an igniter. The ignition device may include only an igniter, or may be a combination of an igniter with a known transfer charge or the like.

The igniter has an igniter main body including an ignition portion and a metallic igniter collar surrounding and holding the igniter main body.

A second end opening of the cylindrical housing is closed with a partition wall formed of a metal. The metal of the partition wall may be the same as or different from that of the cylindrical housing. The partition wall and the cylindrical housing (a circumferential wall) may be integrally famed.

An inner space of the cylindrical housing in which the first end opening and the second end opening are closed is a combustion chamber, and a perforated cylindrical body is disposed therein.

The perforated cylindrical body is formed of a metal, and the metal may be the same as or different from that of the cylindrical housing.

In the perforated cylindrical body, an outer diameter and an inner diameter may be uniform or may vary in part. For example, the outer diameter of the perforated cylindrical body may be decreased from the first end toward the second end.

An arrangement of holes of the perforated cylindrical body is not particularly limited but can be as follows:

the holes of the same size are arranged uniformly between the first end and the second end (a formation density of the holes is uniform);

the holes of the same size are arranged nonuniformly between the first end and the second end (a formation density of the holes is not uniform); and the holes of different sizes are arranged between the first end and the second end.

The combustion chamber is divided into a first chamber in an inside space of the perforated cylindrical body and a second chamber in an outside space thereof, and both the first chamber and the second chamber are filled with gas generating agents.

Respective volumes of the first chamber and the second chamber may be the same or different.

The gas generating agents filled into the first chamber and the second chamber may be the same or different. When different gas generating agents are used for the first chamber and the second chamber, those that differ in at least one of a composition, a composition ratio, a shape and size can be used.

The gas discharge port is a through hole foiled in the partition wall facing the second chamber, and the gas discharge port does not face the first chamber.

The gas discharge port may be closed with a seal tape for moisture resistance.

A large number of gas generating agents are filled in the cylindrical housing (the combustion chamber) of the gas generator. The gas generating agents are arranged such that gaps are formed between the gas generating agents.

Each of the gas generating agents used therein is a molded article which is molded into a desired shape such as a tablet, a column, or those having a recess or a through hole.

Since the cylindrical housing (the combustion chamber) has an elongated shape, when the igniter at one end opening is actuated to ignite and burn the gas generating agents, combustion sequentially proceeds from the gas generating agents located near the igniter toward the gas generating agents located far from the igniter.

However, when the combustion occurs at one end opening and a combustion gas is generated thereby, a compression phenomenon is likely to occur in the uncombusted gas generating agents which are pressurized toward the other end opening by the pressure of the combustion gas.

When such compression phenomenon occurs, the gaps between the gas generating agents are collapsed to impede a flow of the combustion gas, and a combustibility of the gas generating agents as a whole and a gas discharge efficiency are degraded.

In the gas generator of the present invention, the perforated cylindrical body is disposed in the combustion chamber, the combustion chamber is divided into the first chamber on the inside and the second chamber on the outside, and the combustion gas flows in and out of the first chamber and the second chamber.

When the igniter at the first end of the perforated cylindrical body is actuated to ignite and burn the gas generating agents in the first chamber, it is conceivable that the compression phenomenon occurs in the gas generating agents in the first chamber and advance of the combustion to the second end is impeded in the same manner as in the conventional art.

However, in the present invention, a combustion gas generated from the gas generating agents in the first chamber flows into the second chamber through the holes of the perforated cylindrical body to burn the gas generating agents in the second chamber, and a combustion gas generated from the gas generating agents in the second chamber flows into the first chamber through the holes of the perforated cylindrical body to burn the gas generating agents in an uncombusted portion in the first chamber, so that the combustion of the gas generating agents in the first chamber and the combustion of the gas generating agents in the second chamber promote each other.

Therefore, the compression phenomenon as described above does not occur, and an ignitability, a combustibility of the gas generating agents and gas discharge performance are improved even with the gas generating agents filled in the elongated combustion chamber.

Further, in the gas generator according to the first aspect, even when the compression phenomenon occurs in a large number of the gas generating agents in the combustion chamber (the first chamber), a gas flow path including gaps between the gas generating agents is secured. Therefore, the first aspect does not apply to a gas generator in which a small number, such as one or two, of gas generating agents are filled in a combustion chamber, or a gas generator in which no gaps are formed between the gas generating agents, in other words, a gas generator in which the above compression phenomenon does not occur in the gas generating agents. The same also applies to each of the following aspects.

The gas discharge port of the gas generator of the second aspect is a through hole formed in a portion of the cylindrical housing facing the second chamber on the side of the partition wall.

Here, "the side of the partition wall" indicates a position of the gas discharge port preferably at a length of 0.3 or less from the surface of the partition wall on the side of the combustion chamber, and more preferably at a length of 0.2 or less, where a length from the first end opening of the cylindrical housing to the surface, on the side of the combustion chamber, of the partition wall closing the second end opening is set to 1.

In the gas generator according to the third aspect, a diffuser portion is provided to the gas generator according to the first aspect, and other components are the same as in the first aspect.

The diffuser portion itself can be in a cup shape, as in conventional gas generators.

Separate members to be joined by welding or the like may be used as the diffuser portion, or the diffuser portion can be formed integrally with the cylindrical housing.

The gas generator according to the third aspect includes a first gas discharge port formed in the partition wall and a second gas discharge port formed in the diffuser portion.

The second gas discharge port may be formed in the bottom surface or in the circumferential wall of the cup-shaped diffuser.

Either of the first gas discharge port and the second gas discharge port may be closed with a seal tape for moisture resistance.

In the fourth aspect, gas generating agents and a pressurized gas (argon, helium, or the like) are used in combination as a gas source.

Therefore, a combustion chamber filled with the gas generating agents and a pressurized gas chamber filled with the pressurized gas at a high pressure are provided, and a diffuser chamber is further provided between the combustion chamber and the pressurized gas chamber.

Although the gas generator in which the combustion chamber, the diffuser chamber and the pressurized gas chamber are arranged in this order is known, in the gas generator according to the fourth aspect, a chamber of the same structure as that in the first aspect is used as the combustion chamber.

In the fourth aspect, a breaking device for a closing member which closes between the diffuser chamber and the pressurized gas chamber is used, equivalent to the partition wall according to the first aspect and the third aspect.

The first gas discharge port is a through hole formed in a thickness direction in the base plate portion of the breaking device.

The second gas discharge port is a through hole formed in a circumferential wall of the cylindrical housing forming the diffuser chamber.

The gas discharge port of the gas generator according to the fifth aspect includes a port formed in the portion of the partition wall facing the second chamber and a port formed in the portion of the cylindrical housing facing the second chamber on the side of the partition wall.

Here, "the side of the partition wall" indicates a position of the gas discharge port preferably at a length of 0.3 or less from the surface of the partition wall on the side of the combustion chamber, and more preferably at a length of 0.2 or less, where a length from the first end opening of the cylindrical housing to the surface, on the side of the combustion chamber, of the partition wall closing the second end opening is set to 1.

At the time of actuation, the same operation as in the first aspect is performed in the combustion chamber, and the combustion gas in the combustion chamber is discharged from the first gas discharge port into the diffuser chamber.

Further, when the breaking device slides in the axial direction due to the pressure rise in the combustion chamber and the closing member is broken, a gas discharge path from the pressurized gas chamber to the diffuser chamber is opened.

Therefore, the combustion gas in the combustion chamber and the pressurized gas in the pressurized gas chamber enter the diffuser chamber and are thereafter discharged from the second gas discharge port to the outside of the gas generator.

It is preferable in the gas generator according to the first aspect to the fourth aspect that a perforated cylindrical body in which an opening area of the holes is increased from the first end toward the second end is used.

A method for making the opening area of the holes in the perforated cylindrical body to increase from the first end toward the second end can be:

a method in which a formation density of the holes is increased continuously or in a stepwise manner from the first end toward the second end; and a method in which size of the holes is increased continuously or in a stepwise manner from the first end toward the second end.

In the case of increasing in a stepwise manner, for example, a method is employed such that the perforated cylindrical body is sectioned into a plurality of zones in the longitudinal direction and the formation density or the size of the holes is changed for each zone.

It is preferable in the gas generators according to the first aspect to the fourth aspect that a volume (V1) of the first chamber of the combustion chamber and a volume (V2) of the second chamber satisfy a relationship of V2>V1.

Since the gas discharge port (the first gas discharge port) faces the second chamber, V2>V1 is preferably satisfied because a flow of the combustion gas becomes smoother and combustion of the gas generating agents is further promoted.

In the gas generator of the present invention, an ignitability and a combustibility of the gas generating agents filled in the elongated combustion chamber are improved, and a combustion gas is also easily discharged from the combustion chamber.

The gas generator of the present invention is used, for example, as a gas generator for an airbag apparatus to be installed in an automobile.

DESCRIPTION OF EMBODIMENTS (1) Gas Generator Depicted in FIG. 1

In a gas generator 1, a cylindrical housing 10 formed of a metal such as iron or stainless steel is used.

A first end opening 10a of the cylindrical housing 10 is closed by an igniter 11.

The igniter 11 has an igniter main body including an ignition portion 12, and an igniter collar 13 surrounding and holding the igniter main body.

An annular cushioning material 14 formed of a resin, a rubber, a wire mesh or the like is arranged around the ignition portion 12.

A second end opening 10b on the side axially opposite to the first end opening 10a of the cylindrical housing 10 is closed by a partition wall 15.

An inner space of the cylindrical housing 10 is a combustion chamber 20, and a perforated cylindrical body 21 is disposed in the combustion chamber 20.

The perforated cylindrical body 21 is arranged such that a first end 21a thereof is abutted against the igniter collar 13 of the igniter 11 and surrounds the ignition portion 12 of the igniter 11. In FIG. 1, the perforated cylindrical body 21 is abutted against the igniter collar 13, but the perforated cylindrical body may not be abutted against the igniter collar 13.

In the perforated cylindrical body 21, a second end 21b on the side axially opposite to the first end 21a is located on the side of the partition wall 15.

The second end 21b may be abutted against a surface 15a of the partition wall 15 on the side of the combustion chamber 20 or may be opposed thereto with a slight gap therebetween. The slight gap is a gap equal to or less than a diameter of holes (a hole having the smallest diameter when the holes have different diameters) of the perforated cylindrical body 21.

The second end 21b of the perforated cylindrical body 21 may be fitted into an annular groove or a circular recess formed in the surface 15a of the partition wall 15 (the surface in which gas discharge ports 16 are not formed).

An inside space of the perforated cylindrical body 21 disposed in the combustion chamber 20 is a first chamber 22 filled with part of gas generating agents (first gas generating agents 25), and an outside space of the perforated cylindrical body 21 is a second chamber 23 filled with the remaining gas generating agents (second gas generating agents 26).

The first gas generating agents 25 and the second gas generating agents 26 may be the same, or may be different from each other in one or more of a composition (a combination of fuel, oxidizing agent, and the like), a composition ratio (a ratio of fuel, oxidizing agent, and the like), a shape and size.

Although the first gas generating agents 25 and the second gas generating agents 26 are in a form of a tablet in FIG. 1, the gas generating agents may have another shape such as a columnar shape, and may be further provided with a recess and a through hole.

A cylindrical body which has a uniform outer diameter and inner diameter is used as the perforated cylindrical body 21, but a cylindrical body in which an outer diameter and an inner diameter are decreased from the first end 21a toward the second end 21b can be used instead.

It is preferable to use the cylindrical body in which the outer diameter and the inner diameter are decreased from the first end 21a toward the second end 21b as the perforated cylindrical body 21 because an ignitability and a combustibility at the initial stage of actuation of the igniter 11 are improved.

The perforated cylindrical body 21 has a large number of through holes (gas passage holes) 27 in the circumferential wall. In FIG. 1, the gas passage holes 27 of the same size are uniformly dispersed.

An opening area of the gas passage holes 27 can be increased from the first end 21a toward the second end 21b.

It is preferable to make the opening area of the gas passage holes 27 to increase from the first end 21a toward the second end 21b because an ignitability and a combustibility of the gas generating agents (the first gas generating agents 25 and the second gas generating agents 26) located far from the igniter 11 are improved.

The opening area is increased or decreased by adjusting size or a formation density of the gas passage holes 27.

A volume (V1) of the first chamber 22 of the combustion chamber 20 and a volume (V2) of the second chamber 23 preferably have a relationship of V2>V1, and more preferably are within a range of V2/V1=1.1 to 1.5.

When V2>V1 and V2/V1=1.1 to 1.5 are satisfied, an ignitability and a combustibility of the gas generating agents (the first gas generating agents 25 and the second gas generating agents 26) are improved.

The gas discharge ports 16 are through holes formed in the partition wall 15 and are formed only in a portion thereof facing the second chamber 23.

In the gas discharge ports 16, 4 to 8 through holes are annularly arranged.

The gas discharge ports 16 may be closed with a metal seal tape from the inside or the outside.

Next, an operation of the gas generator 1 depicted in FIG. 1 will be described.

When the igniter 11 is actuated, the first gas generating agents 25 in the first chamber 22 in front of the ignition portion 12 are ignited and burned to generate a combustion gas.

The combustion gas generated in the first chamber 22 causes the combustion of the first gas generating agents 25 to proceed from the first end 21a to the second end 21b of the perforated cylindrical body 21. At the same time, the combustion gas also flows from the gas passage holes 27 of the perforated cylindrical body 21 into the second chamber 23 to ignite and burn the second gas generating agents 26.

At this time, the uncombusted first gas generating agents 25 in a region close to the partition wall 15 are on the axis X of the ignition portion 12, receives an ignition pressure and the like from the ignition portion 12, and is pressurized toward the partition wall 15.

A filling amount (a filling number) of the first gas generating agents 25 and the second gas generating agents 26 is adjusted in accordance with a gas generation amount (a gas generation capacity) of the gas generator 1, and for example, about several tens to several hundreds of gas generating agents are filled in the respective chambers. Therefore, gaps are created between the gas generating agents, and the above compression phenomenon caused by an impact at the time of the ignition occurs in the first gas generating agents 25 in the first chamber 22.

Accordingly, the gaps between the first gas generating agents 25 are narrowed, and the gas does not flow easily toward the partition wall 15 along the axis X in the first chamber 22.

In the gas generator of the present invention, part of the combustion gas generated in the first chamber 22 flows from the gas passage holes 27 to the second chamber 23 and ignites and burns the second gas generating agents 26. At this time, since the compression phenomenon caused by the impact at the time of ignition does not occur in the second gas generating agents 26, the combustion gas is promptly discharged from the gas discharge ports 16 facing the second chamber 23, and blockage of the gas flow path is unlikely to occur.

The combustion gas in the second chamber 23 flows from the gas passage holes 27 of the perforated cylindrical body 21 into the first chamber 22 and promotes combustion of the uncombusted first gas generating agents 25. In parallel therewith, the combustion gas in the first chamber 22 flows from the gas passage holes 27 of the perforated cylindrical body 21 into the second chamber 23 and is discharged from the gas discharge ports 16.

Accordingly, even when the above compression phenomenon in the gas generating agents occurs in the region close to the partition wall 15, the combustion is promoted in both the first gas generating agents 25 and the second gas generating agents 26. As a result, a flow of the combustion gas becomes smoother, and a combustion path up to the gas discharge ports 16 is secured.

(2) Gas Generator Depicted in FIG. 2

A gas generator 1A depicted in FIG. 2 is the same as the gas generator 1 depicted in FIG. 1, except that a position of gas discharge ports 16a is different.

The gas discharge ports 16a are through holes formed in a portion of the cylindrical housing 10 facing the second chamber 23 on the side of the partition wall 15.

When a length from the first end opening 10a of the cylindrical housing 10 to the surface 15a, on the side of the combustion chamber 20, of the partition wall 15 closing the second end opening 10b is set to 1, the gas discharge ports 16a are formed to position at a length of 0.2 or less from the surface 15a of the partition wall on the side of the combustion chamber. An operation of the gas generator depicted in FIG. 2 is the same as that in FIG. 1.

(3) Gas Generator Depicted in FIG. 3

A gas generator 1B depicted in FIG. 3 is the same as the gas generator 1 depicted in FIG. 1, except that the gas discharge ports 16 and the gas discharge ports 16a are provided.

The gas discharge ports 16 are the same as those in the gas generator 1 depicted in FIG. 1.

The gas discharge ports 16a are the same as those in the gas generator 1A depicted in FIG. 2. An operation thereof is the same as that of the gas generator depicted in FIG. 1.

(4) Gas Generator Depicted in FIG. 4

A gas generator 1C depicted in FIG. 4 is the same as the gas generator 1 depicted in FIG. 1 except that a diffuser portion 30 is provided.

The diffuser portion 30 is in a cup shape including a bottom surface 31, a circumferential wall 32 and an opening 33, and an inclined surface 34 in which an inner diameter on the side of the bottom surface 31 is smaller is provided between the opening 33 and the circumferential wall 32.

The diffuser portion 30 depicted in FIG. 4 has a plurality of second gas discharge ports 36 in the circumferential wall 32, but the gas discharge ports may be provided in the bottom surface 31, or in both the bottom surface 31 and the circumferential wall 32.

The opening 33 of the diffuser portion 30 is welded to the second end opening 10b of the cylindrical housing 10 (a welded portion 39).

In the gas generator 1C depicted in FIG. 4, the through holes in the partition wall 15 are the first gas discharge ports 16, and a combustion gas generated in the combustion chamber 20 is discharged from the first gas discharge ports 16 into the diffuser portion 30 and then discharged from the second gas discharge ports 36 to the outside of the gas generator 1C. The mechanism at the time of ignition of the igniter 11 to discharge of the combustion gas from the first gas discharge ports 16 is the same as that of the gas generator depicted in FIG. 1.

(5) Gas Generator Depicted in FIG. 5

In a gas generator 100 depicted in FIG. 5, a cylindrical housing 101, which is obtained by integrating a combustion chamber housing 102 and a pressurized gas chamber housing 103 by welding, is used.

A combustion chamber 110, a diffuser chamber 140 and a pressurized gas chamber 150 are provided in the order of description from a first end opening 102a of the cylindrical housing 101 (the combustion chamber housing 102) toward a closing surface 105 at the second end opening of the cylindrical housing 101 (the pressurized gas chamber housing 103) on the opposite side in the axial direction.

A metallic closing member 151 closes between the diffuser chamber 140 and the pressurized gas chamber 150.

The first end opening 102a of the cylindrical housing 101 (the combustion chamber housing 102) is closed by an igniter 111.

The igniter 111 has an igniter main body including an ignition portion 112, and a metallic igniter collar 113 surrounding and holding the igniter main body.

The side axially opposite to the igniter 111 in the combustion chamber housing 102 is closed by a breaking device 130 for breaking the closing member 151.

An inner space between the igniter 111 and the breaking device 130 in the combustion chamber housing 102 is the combustion chamber 110, and a perforated cylindrical body 120 is disposed in the combustion chamber 110.

The perforated cylindrical body 120 is arranged such that a first end 120a thereof is abutted against the igniter collar 113 of the igniter 111 and surrounds the ignition portion 112 of the igniter 111. In FIG. 5, the perforated cylindrical body 120 is abutted against the igniter collar 113, but the perforated cylindrical body may not be abutted against the igniter collar 113.

In the perforated cylindrical body 120, a second end 120b on the side axially opposite to the first end 120a is located on the side of the breaking device 130.

The second end 120b may be abutted against a surface 132a, on the side of the combustion chamber 110, of a base plate portion 132 of the breaking device 130 or may be opposed thereto with a slight gap therebetween. The slight gap is equal to or less than a diameter of gas passage holes 127 (a hole having the smallest diameter when the holes have different diameters) in the perforated cylindrical body 120.

An inside space of the perforated cylindrical body 120 disposed in the combustion chamber 110 is a first chamber 122 filled with part of gas generating agents (first gas generating agents 125), and an outside space of the perforated cylindrical body 120 is a second chamber 123 filled with the remaining gas generating agents (second gas generating agents 126).

The first gas generating agents 125 and the second gas generating agents 126 may be the same, or may be different from each other in one or more of a composition (a combination of fuel, oxidizing agent, and the like), a composition ratio (a ratio of fuel, oxidizing agent, and the like), a shape and size.

Although the first gas generating agents 125 and the second gas generating agents 126 are in a form of a tablet in FIG. 5, the gas generating agents may have another shape such as a columnar shape, and may be further provided with a recess and a through hole.

A cylindrical body which has a uniform outer diameter and inner diameter is used as the perforated cylindrical body 120, but a cylindrical body in which an outer diameter and an inner diameter are decreased from the first end 120a toward the second end 120b can be used instead.

It is preferable to use the cylindrical body in which the outer diameter and the inner diameter are decreased from the first end 120a toward the second end 120b as the perforated cylindrical body 120 because an ignitability, a combustibility and a combustion gas discharge efficiency at an initial stage of actuation of the igniter 111 are improved.

The perforated cylindrical body 120 has a large number of through holes (gas passage holes) 127 in the circumferential wall. In FIG. 5, the gas passage holes 127 of the same size are uniformly dispersed.

An opening area of the gas passage holes 127 can be increased from the first end 120a toward the second end 120b.

It is preferable to make the opening area of the gas passage holes 127 to increase from the first end 120a toward the second end 120b because an ignitability and a combustibility of the gas generating agents (the first gas generating agents 125 and the second gas generating agents 126) located far from the igniter 111 are improved.

The opening area is increased or decreased by adjusting size or a formation density of the gas passage holes 127.

A volume (V1) of the first chamber 122 of the combustion chamber 110 and a volume (V2) of the second chamber 123 preferably have a relationship of V2>V1, and more preferably are within a range of V2/V1=1.1 to 1.5.

When V2>V1 and V2/V1=1.1 to 1.5 are satisfied, an ignitability, a combustibility and a combustion gas discharge efficiency of the gas generating agents (the first gas generating agents 125 and second the gas generating agents 126) are improved.

The breaking device 130 for breaking the closing member 151 is disposed in the diffuser chamber 140.

The breaking device 130 includes a base plate portion 132 having a plurality of through holes (first gas discharge ports) 131 in the thickness direction and a breaking portion 133 provided vertically from a center portion of the base plate portion 132. A distal end 134 of the breaking portion 133 has a shape corresponding to a curved shape of the closing member 151.

A circumferential surface of the base plate portion 132 of the breaking device 130 is abutted against an inner wall surface of the combustion chamber housing 102.

The base plate portion 132 is held from both sides in the axis X direction by low protrusions formed at an interval in the axial direction on the inner wall surface of the combustion chamber housing 102 so as to be prevented from sliding before the actuation.

A plurality of through holes (first gas discharge ports 131) in the thickness direction are formed in the surface of the base plate portion 132 where the breaking portion 133 is not formed.

As the first gas discharge ports 131, 4 to 8 through holes are annularly arranged to face the second chamber 123.

A plurality of second gas discharge ports 136 are uniformly arranged in a circumferential direction in a portion of the combustion chamber housing 102 facing the diffuser chamber 140.

A stopping means 137 for stopping the sliding of the breaking device 130 (the base plate portion 132) in the axis X direction at the time of actuation is formed on a portion of the combustion chamber housing 102 facing the diffuser chamber 140.

The stopping means 137 is a plurality of independent protrusions formed at equal intervals in the circumferential direction.

Gas such as argon or helium is filled in the pressurized gas chamber 150 at a high pressure. After the gas is filled from a gas injection hole in the closing surface 105, the injection hole is closed by welding an inserted pin 106 and the closing surface 105 to each other.

Next, an operation of the gas generator 100 depicted in FIG. 5 will be described.

When the igniter 111 is actuated, the first gas generating agents 125 in the first chamber 122 in front of the ignition portion 112 are ignited and burned to generate a combustion gas.

The combustion gas generated in the first chamber 122 causes the combustion of the first gas generating agents 25 to proceed from the first end 120a to the second end 120b of the perforated cylindrical body 120. At the same time, the combustion gas also flows from the gas passage holes 127 of the perforated cylindrical body 120 into the second chamber 123 to ignite and burn the second gas generating agents 126.

At this time, the uncombusted first gas generating agents 125 in a region close to the base plate portion 132 are on the axis X of the ignition portion 112, receive an ignition pressure and the like from the ignition portion 112, and are pressurized toward the base plate portion 132.

A filling amount (a filling number) of the first gas generating agents 125 and the second gas generating agents 126 is adjusted in accordance with a gas generation amount (a gas generation capacity) of the gas generator 100, and for example, about several tens to several hundreds of gas generating agents are filled in the respective chambers. Therefore, gaps are created between the gas generating agents, and the above compression phenomenon caused by an impact at the time of the ignition occurs in the first gas generating agents 125 in the first chamber 122.

Accordingly, the gaps between the first gas generating agents 125 are narrowed, and the gas does not flow easily toward the base plate portion 132 along the axis X in the first chamber 122.

In the gas generator of the present invention, part of the combustion gas generated in the first chamber 122 flows from the gas passage holes 127 to the second chamber 123 and ignites and burns the second gas generating agents 126. At this time, since the compression phenomenon caused by the impact at the time of ignition does not occur in the second gas generating agents 126, the combustion gas is promptly discharged from the first gas discharge ports 131 facing the second chamber 123, and blockage of the gas flow path is unlikely to occur.

The combustion gas in the second chamber 123 flows from the gas passage holes 127 of the perforated cylindrical body 120 into the first chamber 122 and promotes combustion of the uncombusted first gas generating agents 125. In parallel therewith, the combustion gas in the first chamber 122 flows from the gas passage holes 127 of the perforated cylindrical body 120 into the second chamber 123 and is discharged from the first gas discharge ports 131.

As a result of promoting the combustion in both the first gas generating agents 125 and the second gas generating agents 126 as described hereinabove, a region where the above-described compression phenomenon in the gas generating agents occurs is limited, and a flow of the combustion gas becomes smoother.

Accordingly, even when the above compression phenomenon in the gas generating agents occurs in the region close to the base plater portion 132, combustion is promoted in both the first gas generating agents 125 and the second gas generating agents 126. As a result, a flow of the combustion gas becomes smoother, and a combustion path up to the second gas discharge ports 136 is secured.

As described above, when the combustion gas is generated from the first gas generating agents 125 and the second gas generating agents 126 in the combustion chamber 110 and a pressure in the combustion chamber 110 rises, the base plate portion 132 of the breaking device 130 is pushed and the breaking device 130 slides toward the pressurized gas chamber 150.

The breaking device 130 is stopped by colliding with the stopping means 137 after the base plate portion 132 slides by a distance L.

When the breaking device 130 slides in this manner, the closing member 151, which closes between the diffuser chamber 140 and the pressurized gas chamber 150, is broken, a gas discharge path from the pressurized gas chamber 150 to the diffuser chamber 140 is opened, and the pressurized gas in the pressurized gas chamber 150 flows into the diffuser chamber 140.

Further, the combustion gas generated by combustion of the first gas generating agents 125 and the second gas generating agents 126 in the combustion chamber 110 flows from the first gas discharge ports 131 formed in the base plate portion 132 into the diffuser chamber 140.

The combustion gas and the pressurized gas flowing into the diffuser chamber 140 are discharged from the second gas discharge ports 136 to the outside of the gas generator 100.

When the breaking device 130 slides by a distance L, and even when a gap of the distance L is formed between the second end 120b of the perforated cylindrical body 120 and the base plate portion 132 of the breaking device, a combustibility of the first gas generating agents 125 and the second gas generating agents 126 and discharge of the combustion gas from the first gas discharge ports 131 are not affected.

(6) Gas Generators Depicted in FIG. 6 and FIG. 7

A gas generator 100A depicted in FIG. 6 and a gas generator 100B depicted in FIG. 7 differ from the gas generator 100 depicted in FIG. 5 in that a second end 120b of a perforated cylindrical body 120 is fitted into a breaking device 130 (a base plate portion 132).

In the gas generator 100A depicted in FIG. 6, a surface 132a of the base plate portion 132 on the side of a combustion chamber 110 has an annular groove 138a, and the second end 120b of the perforated cylindrical body 120 is fitted in the annular groove 138a.

At the time of actuation, when the breaking device 130 (the base plate portion 132) slides by the distance L (see FIG. 5), the perforated cylindrical body 120 also slides together with the base plate portion 132.

At this time, a gap is created between a first end 120a of the perforated cylindrical body 120 and an ignition portion 112 of an igniter. However, both first gas generating agents 125 and second gas generating agents 126 in proximity to the ignition portion 112 have already been burned, and even though part of the combustion gas moves through the gap between a first chamber 122 and a second chamber 123, the actuation itself is not affected.

In the gas generator 100B depicted in FIG. 7, the surface 132a of the base plate portion 132 on the side of a combustion chamber 110 has a recess 138b with a circular planar shape, and a second end 120b of the perforated cylindrical body 120 is fitted into a recess 138b.

At the time of actuation, when the breaking device 130 (the base plate portion 132) slides by the distance L (see FIG. 5), a perforated cylindrical body 120 also slides together with the base plate portion 132.

At this time, a gap is created between a first end 120a of the perforated cylindrical body 120 and an ignition portion 112 of an igniter. However, both the first gas generating agents 125 and the second gas generating agents 126 in proximity to the ignition portion 112 have already been burned, and even though part of the combustion gas moves through the gap between the first chamber 122 and the second chamber 123, the actuation itself is not affected.

(7) Gas Generator Depicted in FIG. 8 and FIG. 9

A gas generator 100C depicted in FIG. 8 and FIG. 9 differs from the gas generator 100 depicted in FIG. 5 in that a mounting relationship of an igniter 111 and a first end 120a of a perforated cylindrical body 120 is different, and in that a second end 120b of the perforated cylindrical body 120 is fitted into a breaking device 130 (a base plate portion 132).

The perforated cylindrical body 120 has an enlarged diameter portion 120c with an increased outer diameter at the first end 120a.

Compared with the igniter 111 depicted in FIG. 5, an outer diameter of part of the igniter collar 113 is reduced.

As depicted in FIG. 8, the enlarged diameter portion 120c of the first end 120a of the perforated cylindrical body 120 is fitted to part of the igniter collar 113.

As depicted in FIG. 8, the second end 120b of the perforated cylindrical body 120 is fitted into a recess 138b in the same manner as in FIG. 7.

At the time of actuation, when the breaking device 130 (the base plate portion 132) slides by a distance L1, the perforated cylindrical body 120 also slides together with the base plate portion 132.

At this time, as depicted in FIG. 9, a projecting length from the igniter collar 113 to the ignition portion 112 is L2.

In the present embodiment, it is adjusted to obtain a relationship of the projecting length L2>the distance L1. Therefore, even when the breaking device 130 (the base plate portion 132) and the perforated cylindrical body 120 slide by the distance L1, the first end 120a of the perforated cylindrical body 120 surrounds the ignition portion 112.

Therefore, a first chamber 122 and a second chamber 123 are separated from each other, and movement of the combustion gas between the first chamber 122 and the second chamber 123 is implemented only through the gas passage holes 127.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising, in a cylindrical housing, a combustion chamber which is filled with gas generating agents as a gas source, and a gas discharge port for discharging a gas generated by combustion of the gas generating agents,
   the combustion chamber including,
   an ignition device which includes an igniter and closes a first end opening of the cylindrical housing, a partition wall which closes a second end opening of the cylindrical housing on the side axially opposite to the first end opening, and a perforated cylindrical body which is disposed in an inner space of the cylindrical housing,
   the igniter having an igniter main body, which includes an ignition portion, and an igniter collar which surrounds and holds the igniter main body;
   the perforated cylindrical body being disposed such that a first end thereof surrounds the ignition portion of the igniter, and a second end of the perforated cylindrical body being disposed on the axially opposite side located on the side of the partition wall;
   an inside space of the perforated cylindrical body being a first chamber which is filled with part of the gas generating agents, and an outside space of the perforated cylindrical body being a second chamber which is filled with the remaining gas generating agents; and
   the gas discharge port being a through hole which is formed in a portion of the partition wall facing the second chamber.

2. A gas generator comprising, in a cylindrical housing, a combustion chamber which is filled with gas generating agents as a gas source, and a gas discharge port for discharging a gas generated by combustion of the gas generating agents,
   the combustion chamber including,
   an ignition device which includes an igniter and closes a first end opening of the cylindrical housing, a partition wall which closes a second end opening of the cylindrical housing on the side axially opposite to the first end opening, and a perforated cylindrical body which is disposed in an inner space of the cylindrical housing,
   the igniter having an igniter main body, which includes an ignition portion, and an igniter collar which surrounds and holds the igniter main body;
   the perforated cylindrical body being disposed such that a first end thereof surrounds the ignition portion of the igniter, and a second end of the perforated cylindrical body being disposed on the axially opposite side located on the side of the partition wall;
   an inside space of the perforated cylindrical body being a first chamber which is filled with part of the gas generating agents, and an outside space of the perforated cylindrical body being a second chamber which is filled with the remaining gas generating agents; and
   the gas discharge port being a through hole which is formed in a portion of the cylindrical housing facing the second chamber on the side of the partition wall.

3. A gas generator comprising, in a cylindrical housing, a combustion chamber which is filled with gas generating agents as a gas source, and a gas discharge port for discharging a gas generated by combustion of the gas generating agents,
   the combustion chamber including,
   an ignition device which includes an igniter and closes a first end opening of the cylindrical housing, a partition wall which closes a second end opening of the cylindrical housing on the side axially opposite to the first end opening, an inner space which is obtained within the cylindrical housing, and a perforated cylindrical body which is disposed in the inner space;

the igniter having an igniter main body, which includes an ignition portion, and an igniter collar which surrounds and holds the igniter main body;

the perforated cylindrical body being disposed such that a first end thereof surrounds the ignition portion of the igniter, and a second end of the perforated cylindrical body being disposed on the axially opposite side located on the side of the partition wall;

an inside space of the perforated cylindrical body being a first chamber which is filled with part of the gas generating agents, and an outside space of the perforated cylindrical body being a second chamber which is filled with the remaining gas generating agents;

a diffuser portion being arranged at the second end opening of the cylindrical housing, which is closed by the partition wall;

the gas discharge port including a first gas discharge port which is a through hole formed in a portion of the partition wall facing the second chamber and a second gas discharge port which is formed in the diffuser portion; and a combustion gas generated in a combustion chamber being discharged from the first gas discharge port into the diffuser portion and then discharged from the second gas discharge port.

4. A gas generator comprising a combustion chamber which has a first gas discharge port and is filled with gas generating agents, a diffuser chamber which has a second gas discharge port, and a pressurized gas chamber in the order of description from a first end opening of a cylindrical housing toward a second end opening of the cylindrical housing on the side axially opposite thereto;

a closing member closing between the diffuser chamber and the pressurized gas chamber;

a breaking device being disposed between the combustion chamber and the diffuser chamber, the breaking device having a base plate portion and a breaking portion, and moving toward the second end opening at the time of actuation to break the closing member;

the combustion chamber including, an ignition device which includes an igniter and closes a first end opening of the cylindrical housing, the base plate of the breaking device closes a side axially opposite to the first end opening, so that an inner space is obtained within the cylindrical housing, and a perforated cylindrical body which is disposed in the inner space;

the igniter having an igniter main body which includes an ignition portion, and an igniter collar which surrounds and holds the igniter main body; the perforated cylindrical body being disposed such that a first end thereof surrounds the ignition portion of the igniter, and a second end of the perforated cylindrical body is disposed on the axially opposite side located on the side of the partition wall;

an inside space of the perforated cylindrical body being a first chamber which is filled with part of the gas generating agents, and an outside space of the perforated cylindrical body being a second chamber which is filled with the remaining gas generating agents;

the first gas discharge port being opened to transfer a combustion gas from the combustion chamber to the diffuser chamber, and the first gas discharge port being a through hole which is formed in a portion of the base plate facing the second chamber; and the second gas discharge port being opened to discharge the combustion gas and a pressurized gas to the outside of the cylindrical housing, and the second gas discharge port being a through hole which is formed in a portion of a circumferential wall of the cylindrical housing forming the diffuser chamber.

5. A gas generator comprising, in a cylindrical housing, a combustion chamber which is filled with gas generating agents as a gas source, and a gas discharge port for discharging a gas generated by combustion of the gas generating agents, the combustion chamber including, an ignition device which includes an igniter and closes a first end opening of the cylindrical housing, a partition wall which closes a second end opening of the cylindrical housing on the side axially opposite to the first end opening, and a perforated cylindrical body which is disposed in an inner space thereof, the igniter having an igniter main body which includes an ignition portion, and an igniter collar which surrounds and holds the igniter main body;

the perforated cylindrical body being disposed such that a first end thereof surrounds the ignition portion of the igniter, and a second end of the perforated cylindrical body being disposed on the axially opposite side located on the side of the partition wall;

an inside space of the perforated cylindrical body being a first chamber which is filled with part of the gas generating agents, and an outside space of the perforated cylindrical body being a second chamber which is filled with the remaining gas generating agents; and the gas discharge port including a through hole which is formed in a portion of the partition wall facing the second chamber, and a through hole which is formed in a portion of the cylindrical housing facing the second chamber on the side of the partition wall.

6. The gas generator according to claim 1, wherein the perforated cylindrical body includes a plurality of holes such that an opening area of the holes is increased along the length of the perforated cylinder.

7. The gas generator according to claim 1, wherein a volume (V1) of the first chamber of the combustion chamber and a volume (V2) of the second chamber satisfy a relationship of V2>V1.

8. The gas generator according to claim 2, wherein the perforated cylindrical body includes a plurality of holes such that an opening area of the holes is increased along the length of the perforated cylinder.

9. The gas generator according to claim 2, wherein a volume (V1) of the first chamber of the combustion chamber and a volume (V2) of the second chamber satisfy a relationship of V2>V1.

10. The gas generator according to claim 3, wherein the perforated cylindrical body includes a plurality of holes such that an opening area of the holes is increased along the length of the perforated cylinder.

11. The gas generator according to claim 3, wherein a volume (V1) of the first chamber of the combustion chamber and a volume (V2) of the second chamber satisfy a relationship of V2>V1.

12. The gas generator according to claim 4, wherein the perforated cylindrical body includes a plurality of holes such that an opening area of the holes is increased along the length of the perforated cylinder.

13. The gas generator according to claim 4, wherein a volume (V1) of the first chamber of the combustion chamber and a volume (V2) of the second chamber satisfy a relationship of V2>V1.

14. The gas generator according to claim 5, wherein the perforated cylindrical body includes a plurality of holes such that an opening area of the holes is increased along the length of the perforated cylinder.

15. The gas generator according to claim 5, wherein a volume (V1) of the first chamber of the combustion chamber and a volume (V2) of the second chamber satisfy a relationship of V2>V1.

* * * * *